United States Patent
Williams et al.

(10) Patent No.: US 12,528,240 B2
(45) Date of Patent: Jan. 20, 2026

(54) EXTRUDED POLYVINYL ALCOHOL FIBRES AND FIBROUS PRODUCTS

(71) Applicant: Aquapak IP Limited, Birmingham (GB)

(72) Inventors: John Williams, Chirbury (GB); Sian Griffiths, Conwy (GB); Robert Ashworth, Conwy (GB); Jack Eaton, Leeds (GB)

(73) Assignee: Aquapak IP Limited, Birmingham (GB)

( * ) Notice: Subject to any disclaimer, the term of this patent is extended or adjusted under 35 U.S.C. 154(b) by 30 days.

(21) Appl. No.: 18/233,003

(22) Filed: Aug. 11, 2023

(65) Prior Publication Data

US 2024/0051210 A1    Feb. 15, 2024

(30) Foreign Application Priority Data

Aug. 13, 2022 (EP) .................... 22190327
Aug. 13, 2022 (EP) .................... 22190328

(Continued)

(51) Int. Cl.
*C08J 3/18* (2006.01)
*B29C 48/00* (2019.01)
(Continued)

(52) U.S. Cl.
CPC ............ *B29C 48/05* (2019.02); *B29C 48/022* (2019.02); *C08J 3/203* (2013.01); *C08K 5/0016* (2013.01);
(Continued)

(58) Field of Classification Search
CPC .......... C08J 3/18; C08J 3/203; C08J 2329/04; C08K 5/0016; C08K 5/005; C08K 5/053;
(Continued)

(56) References Cited

U.S. PATENT DOCUMENTS 4,478,971 A * 10/1984 Ballard .................. C08L 29/04
                                                             524/388 X
5,342,335 A    8/1994 Rhim
(Continued)

FOREIGN PATENT DOCUMENTS

EP    1000102 B1 * 11/2005 ............... D01F 6/52
WO    9839382 A1    9/1998
(Continued)

OTHER PUBLICATIONS

Wikepedia; Polyvinyl alcohol; May 25, 2025; https://en.wikipedia.org/w/index. hp?title=P~ vin}:L_alcohol&oldid=1292227772.
(Continued)

*Primary Examiner* — Leo B Tentoni
(74) *Attorney, Agent, or Firm* — Young Basile Hanlon & MacFarlane, P.C.

(57) ABSTRACT

This invention relates to polyvinyl alcohol fibers, methods of making polyvinyl alcohol fibers and products manufactured from polyvinyl alcohol fibers. The invention relates particularly but not exclusively to products comprising extruded polyvinyl alcohol fibers, methods of making extruded polyvinyl alcohol fibers and products incorporating such fibers.

12 Claims, 1 Drawing Sheet

(30) Foreign Application Priority Data

Aug. 13, 2022 (EP) ..................................... 22190330
Aug. 13, 2022 (EP) ..................................... 22190331

(51) Int. Cl.

| | | |
|---|---|---|
| *B29C 48/05* | (2019.01) | |
| *C08J 3/20* | (2006.01) | |
| *C08K 5/00* | (2006.01) | |
| *C08K 5/053* | (2006.01) | |
| *C08K 5/098* | (2006.01) | |
| *C08K 5/20* | (2006.01) | |
| *C08K 5/3412* | (2006.01) | |
| *C08L 29/04* | (2006.01) | |
| *D01D 1/04* | (2006.01) | |
| *D01D 5/08* | (2006.01) | |
| *D01D 5/084* | (2006.01) | |
| *D01D 5/088* | (2006.01) | |
| *D01D 5/092* | (2006.01) | |
| *D01D 5/098* | (2006.01) | |
| *D01D 5/10* | (2006.01) | |
| *D01D 5/12* | (2006.01) | |
| *D01D 5/16* | (2006.01) | |
| *D01F 1/02* | (2006.01) | |
| *D01F 1/10* | (2006.01) | |
| *D01F 6/14* | (2006.01) | |
| *D01F 6/50* | (2006.01) | |
| *D01F 6/62* | (2006.01) | |
| *D01G 15/00* | (2006.01) | |
| *D02G 1/14* | (2006.01) | |
| *D02J 1/22* | (2006.01) | |
| *D04H 1/425* | (2012.01) | |
| *D04H 1/4258* | (2012.01) | |
| *D04H 1/4291* | (2012.01) | |
| *D04H 1/4309* | (2012.01) | |
| *D04H 1/435* | (2012.01) | |
| *D04H 1/4382* | (2012.01) | |
| *D04H 1/46* | (2012.01) | |
| *D04H 1/492* | (2012.01) | |
| *D04H 1/56* | (2006.01) | |
| *D04H 1/58* | (2012.01) | |
| *D04H 3/007* | (2012.01) | |
| *D04H 3/009* | (2012.01) | |
| *D04H 3/105* | (2012.01) | |
| *D04H 3/11* | (2012.01) | |
| *D04H 3/16* | (2006.01) | |
| *D04H 5/02* | (2012.01) | |
| *D04H 5/03* | (2012.01) | |
| *B29K 29/00* | (2006.01) | |

(52) U.S. Cl.
CPC .............. *C08K 5/005* (2013.01); *C08L 29/04* (2013.01); *D01D 5/084* (2013.01); *D01D 5/0985* (2013.01); *D01D 5/10* (2013.01); *D01F 1/02* (2013.01); *D01F 6/14* (2013.01); *D01F 6/50* (2013.01); *D02G 1/14* (2013.01); *D04H 1/425* (2013.01); *D04H 1/4258* (2013.01); *D04H 1/4291* (2013.01); *D04H 1/4309* (2013.01); *D04H 1/435* (2013.01); *D04H 1/43835* (2020.05); *D04H 1/46* (2013.01); *D04H 1/492* (2013.01); *D04H 1/56* (2013.01); *D04H 1/58* (2013.01); *D04H 3/007* (2013.01); *D04H 3/16* (2013.01); *B29K 2029/04* (2013.01); *C08J 2329/04* (2013.01); *C08L 2203/12* (2013.01); *C08L 2205/02* (2013.01); *C08L 2205/025* (2013.01); *D10B 2321/06* (2013.01); *D10B 2401/063* (2013.01); *D10B 2505/04* (2013.01); *D10B 2509/00* (2013.01); *D10B 2509/026* (2013.01)

(58) Field of Classification Search
CPC ........ C08K 5/098; C08K 5/20; C08K 5/3412; C08L 29/04; C08L 2203/12; D01D 1/04; D01D 5/08; D01D 5/088; D01D 5/092; D01D 5/12; D01D 5/16; D01F 1/02; D01F 1/10; D01F 6/62; D01G 15/00; D02J 1/22; D04H 3/009; D04H 3/105; D04H 3/11; D04H 3/16; D04H 5/02; D04H 5/03; D10B 2321/06
USPC ............. 264/103, 210.6, 210.8, 211, 211.14, 264/331.11; 156/167, 181; 19/98, 145, 19/296; 28/104, 107; 524/98, 210, 241, 524/251, 270, 386, 387, 388, 728, 765
See application file for complete search history.

(56) References Cited

U.S. PATENT DOCUMENTS

| | | | |
|---|---|---|---|
| 5,500,281 A | * | 3/1996 | Srinivasan ........... D04H 1/4309 28/104 X |
| 6,502,615 B1 | | 1/2003 | Allen |
| 2009/0061719 A1 | * | 3/2009 | Shibutani .................. D01F 6/14 428/401 |
| 2015/0079479 A1 | * | 3/2015 | Hayakawa ........... H01M 50/411 429/255 |
| 2017/0081442 A1 | | 3/2017 | Johnson et al. |
| 2022/0228305 A1 | | 7/2022 | Bridewell et al. |
| 2023/0323255 A1 | | 10/2023 | Barros et al. |

FOREIGN PATENT DOCUMENTS

| | | |
|---|---|---|
| WO | 2017/046361 A1 | 3/2017 |
| WO | 2020219930 A1 | 10/2020 |
| WO | 2021067474 A1 | 4/2021 |
| WO | 2022/008516 A1 | 1/2022 |
| WO | 2022/008521 A1 | 1/2022 |

OTHER PUBLICATIONS

Spunbond nonwoven manufacturing process, NW Fabric, https://www.nwfabric.com/ask/ spunbond-nonwoven-manufacturing-process/, Jan. 28, 2023. (Year: 2023).

* cited by examiner

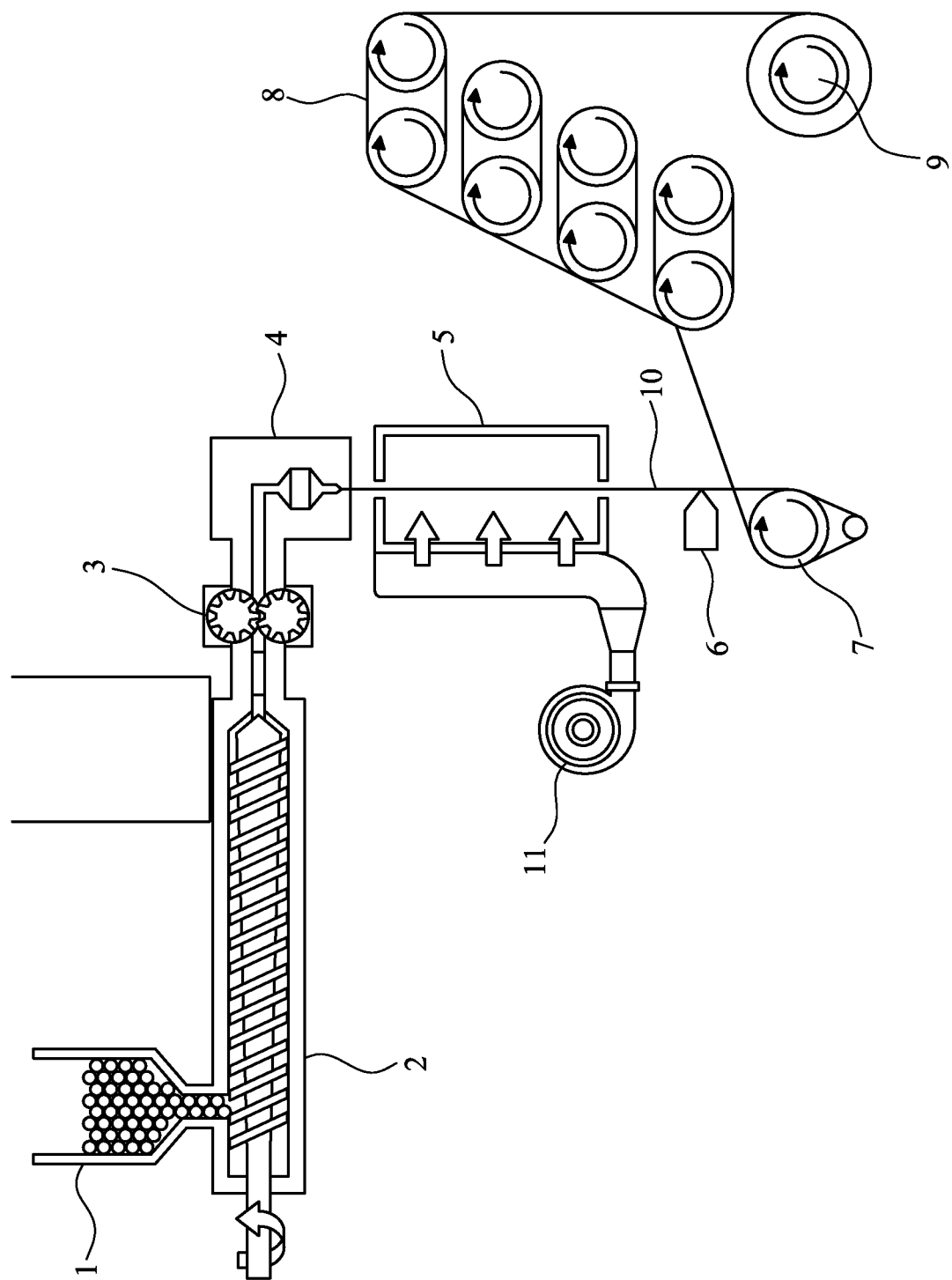

EXTRUDED POLYVINYL ALCOHOL FIBRES AND FIBROUS PRODUCTS

CROSS-REFERENCE TO RELATED APPLICATION(S)

This application claims priority under 35 USC § 119 (a) to EP patent application Ser. No. 22/190,328.9, filed Aug. 13, 2022, EP patent application Ser. No. 22/190,330.5, filed Aug. 13, 2022, EP patent application Ser. No. 22/190,331.3, filed Aug. 13, 2022, and EP patent application Ser. No. 22/190,327.1, filed Aug. 13, 2022, which are hereby incorporated by reference in their entirety for all purposes.

TECHNICAL FIELD

This invention relates to polyvinyl alcohol fibers, methods of making polyvinyl alcohol fibers and products manufactured from polyvinyl alcohol fibers. The invention relates particularly but not exclusively to products comprising extruded polyvinyl alcohol fibers, methods of making extruded polyvinyl alcohol fibers and products incorporating such fibers.

BACKGROUND

Polyvinyl alcohol has many advantages in comparison to polymers which are traditionally used for manufacture of non-woven fiber products. Polyvinyl alcohol is soluble in water, particularly when heated, facilitating reclamation, recycling and environmental degradation.

Polyvinyl alcohol is manufactured by hydrolysis of homopolymer or co-polymers of polyvinyl acetate. Polyvinyl alcohol manufactured by partial or complete hydrolysis of homopolymeric polyvinyl acetate is referred to as homopolymeric polyvinyl alcohol. The degree of hydrolysis determines the properties of the resultant polymer. Co-polymeric polyvinyl alcohols or homopolymeric polyvinyl alcohol with a low degree (LD) of hydrolysis are easy to process but have inferior mechanical and chemical properties. Homopolymeric polyvinyl alcohol with a high degree (HD) of hydrolysis, for example 85% or greater, has superior properties but is not processable without degradation under conditions using apparatus employed for manufacture of polyolefin non-woven fibers.

Polyvinyl alcohol is soluble in water and fibers have traditionally been made by solution spinning methods using polyvinyl alcohol with a low degree (LD) of hydrolysis. In order to enhance water resistance, thermal e.g., hot drawing and chemical e.g., acetylation steps have been required.

WO2017/046361 discloses a method for manufacture of processable polyvinyl alcohol having a degree of hydrolysis of 98% or greater. WO2022/008521 discloses a method for manufacture of processable polyvinyl alcohol having a degree of hydrolysis in the range of 93% to 98% or more. WO2022/008516 discloses a method for manufacture of plasticized polyvinyl alcohol having a degree of hydrolysis of 93 wt % to 98 wt % or more.

SUMMARY

According to a first aspect of the present invention, a method of manufacture of polyvinyl alcohol fibers is provided. The method comprises the steps of providing a polyvinyl alcohol composition comprising homopolymeric polyvinyl alcohol having a degree of hydrolysis of 88 wt % to 98 wt % or greater and a weight average molecular weight in the range from 14,000 to 36,000; a plasticizer selected from the group consisting of: diglycerol, triglycerol, fructose, ribose, xylose, D-mannitol, triacetin, pentaerythritol, dipentaerythritol, methyl pentanediol, 1,2-propanediol, 1,4-butanediol, 2-hydroxy-1,3-propanediol, 3-methyl-1,3-butanediol, 3,3-dimethyl-1,2-butanediol, polyethylene glycol 300, polyethylene glycol 400, alkoxylated polyethylene glycol, caprolactam, tricyclic trimethylolpropane formal, rosin esters, erucamide, and mixtures thereof; and a stabilizer selected from the group consisting of: sodium stearate, potassium oleate, sodium benzoate, calcium stearate, stearic acid, dimethyl pentane diol, propionic acid and mixtures thereof; melting the composition at a temperature from 190° C. to 250° C.; extruding the melted composition to form an extrudate; forming the extrudate into molten fibers; drawing the molten fibers to form individual molten fibers or bundles of molten fibers; and allowing the molten fibers to solidify to form solid fibers or bundles of solid fibers.

According to a second aspect of the present invention there is provided a non-woven product comprising thermally processable homopolymeric polyvinyl alcohol fibers having a degree of hydrolysis of 88 wt % or greater made in accordance with the first aspect of the present invention.

According to a third aspect of the present invention, there is provided a non-woven fiber product comprising homopolymeric polyvinyl alcohol fibers having a degree of hydrolysis of 88 wt % or greater.

BRIEF DESCRIPTION OF THE DRAWINGS

FIG. 1 is a diagrammatic view of fiber extruding apparatus in accordance with this invention.

DETAILED DESCRIPTION

According to a first aspect of the present invention, a method of manufacture of polyvinyl alcohol fibers is provided. The method comprises the steps of providing a polyvinyl alcohol composition comprising homopolymeric polyvinyl alcohol having a degree of hydrolysis of 88 wt % to 98 wt % or greater and a weight average molecular weight in the range from 14,000 to 36,000; a plasticizer selected from the group consisting of: diglycerol, triglycerol, fructose, ribose, xylose, D-mannitol, triacetin, pentaerythritol, dipentaerythritol, methyl pentanediol, 1,2-propanediol, 1,4-butanediol, 2-hydroxy-1,3-propanediol, 3-methyl-1,3-butanediol, 3,3-dimethyl-1,2-butanediol, polyethylene glycol 300, polyethylene glycol 400, alkoxylated polyethylene glycol, caprolactam, tricyclic trimethylolpropane formal, rosin esters, erucamide, and mixtures thereof; and a stabilizer selected from the group consisting of: sodium stearate, potassium oleate, sodium benzoate, calcium stearate, stearic acid, dimethyl pentane diol, propionic acid and mixtures thereof; melting the composition at a temperature from 190° C. to 250° C.; extruding the melted composition to form an extrudate; forming the extrudate into molten fibers; drawing the molten fibers to form individual molten fibers or bundles of molten fibers; and allowing the molten fibers to solidify to form solid fibers or bundles of solid fibers.

According to a second aspect of the present invention there is provided a non-woven product comprising thermally processable homopolymeric polyvinyl alcohol fibers having a degree of hydrolysis of 88 wt % or greater made in accordance with the first aspect of the present invention.

According to a third aspect of the present invention, there is provided a non-woven fiber product comprising homopolymeric polyvinyl alcohol fibers having a degree of hydrolysis of 88 wt % or greater.

The degree of hydrolysis may be 95 wt % to 98 wt %, for example 93 wt % to 95 wt %. In embodiments, the molecular weight of the homopolymeric polyvinyl alcohol may be in the range from 14,000 to 35,000.

Molecular weights in this specification are weight average molecular weights and are measured using conventional liquid chromatographic techniques.

In embodiments, the composition may be melted at a temperature from 220° C. to 240° C., for example 220° C. to 230° C.

The polyvinyl alcohol composition of this invention may have a melt flow index (MFI) of 30 to 80 g/10 min, for example 50 to 75 g/10 min, for example 70 to 75 g/10 min. Melt flow indices referred to in this specification are determined at 230° C. using a weight of 10 kg by conventional techniques.

The polyvinyl alcohol composition of this invention is stable at the temperature at which it is melted and extruded. Polyvinyl alcohol, not containing a plasticizer and stabilizer as disclosed herein, particularly the homopolymer having a high degree of hydrolysis, may be liable to decompose at the temperatures required for melting and extrusion processing.

Advantageous polyvinyl alcohol fibers of this invention are capable of being processed on a commercial scale, using conventional fiber processing apparatus.

Polyvinyl alcohol according to this invention can be processed into filaments or fibers. These may be converted by crimping and cutting into staple fibers suitable for carding, wet laying and air laying to form a range of non-woven products. Advantageous polyvinyl alcohol fibers of this invention are capable of being processed on a commercial scale, for example using apparatus running at 4,500 m·min$^{-1}$ The stabilized polyvinyl alcohol polymers used in this invention may be manufactured in accordance with WO2022/008516 and WO2022/008521, the disclosures of which are incorporated into this specification by reference for all purposes.

The polyvinyl alcohol composition may be made by a method comprising the steps of introducing into a mixing reactor a polyvinyl alcohol polymer comprising homopolymeric polyvinyl alcohol or a blend thereof having a degree of hydrolysis in the range of 88 wt % to 98 wt % or more; where the mixing reactor comprises a blending chamber having a primary inlet, a primary outlet and at least two inter-engaging components extending between the primary inlet and primary outlet, the components being arranged to apply a shearing force to the polymer while the polymer is conveyed by the components from the inlet through a reaction zone to the outlet; one or more secondary inlets located downstream from the primary inlet for introducing reactants comprising a processing aid, a plasticizer and a reactive stabilizer to the chamber to form a reaction mixture; where the plasticizer is selected from the group disclosed above; where the reactive stabilizer is selected from the group consisting of sodium stearate, potassium oleate, sodium benzoate, calcium stearate, stearic acid, dimethyl propionic acid, and mixtures thereof; where the blending chamber comprises a plurality of heated regions arranged so that the mixture is subjected to a temperature profile whereby the temperature increases from the inlet to the outlet; a secondary outlet located between the reaction zone and primary outlet arranged to allow removal of processing aid from the chamber; reacting the processing agent, plasticizer and polymer in the reaction zone to form plasticized polymer; and allowing the plasticized polymer to pass from the primary outlet.

Use of a reactive mixing apparatus, typically an extruder in accordance with this invention allows the processing aid and plasticizer to be reacted with the polyvinyl alcohol or blend thereof, without decomposition of the polymer followed by removal of all or most of the processing aid from the secondary outlet to give plasticized polyvinyl alcohol or a blend thereof.

Use of a reactive stabilizer may result in an advantageous reduction in the extent of degradation during melt processing. This allows homopolymeric polyvinyl alcohol having a high degree of hydrolysis, for example 88 wt % or higher to be processed to form fibers or pellets from which fibers may be formed by extrusion. The reactive stabilizer may be used in an amount of about 0.1 wt % to about 5 wt %, for example about 0.1 wt % to about 3 wt %, for example 0.1 wt % to about 1.5 wt %, for example from about 0.2 wt % to about 0.5 wt %, for example about 0.25 wt %.

The reactive stabilizers of this invention may decrease the extent of degradation of the polymer during processing. Homopolymeric polyvinyl alcohol has been difficult to process due to degradation at the high temperatures required. The liability of degradation has led to use of polyvinyl alcohol co-polymers with a consequent loss of engineering properties. This can be seen by UV spectral analysis of the amount of conjugation present in the polymer. Sodium benzoate has been found to be particularly effective. Use of homopolymeric polyvinyl alcohol is particularly advantageous.

Homopolymeric polyvinyl alcohol is manufactured by hydrolysis of homopolymeric polyvinyl acetate, the degree of hydrolysis being 93 wt % or more in embodiments of this invention. Polyvinyl alcohol co-polymers made by hydrolysis of polyvinyl acetate co-polymers have inferior properties compared to homopolymeric polyvinyl alcohol. Homopolymeric polyvinyl alcohol may exhibit advantageous properties.

Polyvinyl alcohol polymers of this invention may have high tensile strength and flexibility.

The polyvinyl alcohol may be manufactured by hydrolysis of homopolymeric polyvinyl acetate, where the extent of hydrolysis is in the range from 88 wt % up to 98 wt %, for example 93 wt % to less than 98 wt %, for example 93 wt % to 97 wt %, for example 93 wt % to 95 wt %.

A blend of two or more polyvinyl alcohol polymers may be employed, for example a blend of two polyvinyl alcohol polymers with a relatively high molecular weight and a relatively low molecular weight respectively.

A blend of polyvinyl alcohols with the same molecular weight and different degrees of hydrolysis can be combined. Blending different polyvinyl alcohol grades together enables the properties of the resultant polymer to be enhanced, for example melt strength.

For fiber production a blend of two polyvinyl alcohol polymers with a molecular weight in the range 22,000 to 38,000, a first polymer having a low degree of hydrolysis and a second polymer having a high degree of hydrolysis may be blended in a ratio of 40:60 to 60:40, for example about 50:50 by weight.

The blends of different molecular weight polymers employed are selected in accordance with the physical properties required in the finished product. This may require different molecular weight materials being used. Use of more than two different molecular weight polymers may be advantageous. The use of a single molecular weight polymer is not precluded.

Use of a blend may allow control of the viscosity of the polymer. Selection of a stabilizer in accordance with the present invention allows use of blends of a desired viscosity without a loss of other properties. Alternatively, use of a blend may permit use of polyvinyl alcohol with one or more stabilizers while maintaining viscosity or other properties to permit manufacture of pellets or films.

The processing aid is preferably water. Alternatively, the processing aid may comprise a mixture of water and one or more hydroxyl compounds with a boiling point less than the boiling point or melting point of the plasticizer. Use of water is preferred for cost and environmental reasons.

Two or more plasticizers may be employed. When a mixture of plasticizers is employed, a binary mixture may be preferred. In an embodiment, the plasticizer may be selected from the group consisting of: diglycerol, triglycerol, xylose, D-mannitol, triacetin, dipentaerythritol, 1,4-butanediol, 3,3-dimethyl-1,2-butanediol, and caprolactam. The total amount of plasticizer in the formulation may be from about 15 wt % to about 30 wt %.

Polymer compositions and fibers of the present invention may not include any or any substantial amount of a water-soluble salt, oil, wax or ethylene homopolymer or copolymer.

The method of this invention provides many advantages. The method allows formation of thermally processable polyvinyl alcohol which can be used to create economical fibers that are highly functional while eliminating plastic pollution. Polyvinyl alcohol is water-soluble, non-toxic to the environment and inherently biodegradable. Hydrophilic polymers, for example, polyvinyl alcohol degrade environmentally faster than hydrophobic polymers and do not show bioaccumulation. Thermoplastic polyvinyl alcohol can be mechanically recycled into pellets for repeated use.

Fibers of this invention may have an advantageous smaller diameter. Fibers having a smaller diameter have a greater surface area which may be advantageous for air filtration, for example in face masks. Finer fibers may also be softer in texture. Furthermore, finer fibers may also have an increased rate of biodegradation after use.

According to a second aspect of the present invention there is provided a non-woven product comprising thermally processable homopolymeric polyvinyl alcohol fibers having a degree of hydrolysis of 88 wt % or greater made in accordance with the first aspect of the present invention.

According to a third aspect of the present invention, there is provided a non-woven fiber product comprising homopolymeric polyvinyl alcohol fibers having a degree of hydrolysis of 88 wt % or greater.

A non-woven product is defined by ISO9092 as an engineered fibrous assembly, primarily planar, which has been given a designed level of structural integrity by physical and/or chemical means, excluding weaving, knitting or paper making.

Homopolymeric polyvinyl alcohol fibers of this invention provide many advantages in comparison to previously available polyvinyl alcohol containing fibers. The fibers of this invention and products made from these fibers exhibit improved tensile strength, barrier properties, water solubility and biodegradability. Homopolymeric polyvinyl alcohol fibers may unexpectedly exhibit all of these properties. In comparison, copolymers have only been able to compromise and provide one or more of these properties at the expense of other properties. The fibers and products of the present invention have a desirable monomaterial structure which does not suffer from this disadvantage.

Non-woven products comprising polyvinyl alcohol fibers of this invention in combination with fibers of cellulose pulp, viscose and mixtures thereof have excellent flushability, for example in accordance with UK Water Fine to Flush WIZ Apr. 2, 2006. Wet wipes manufactured from non-woven fibers of this invention exhibit excellent dry and wet tensile strength.

Fibers of this invention may be made by extrusion of filaments of the melted polyvinyl alcohol polymer through a spinneret having small holes, for example 0.25 mm in diameter. The extruded filaments may be drawn using godet rollers rotating at different speeds to form a multi filament tow. The multifilament tow may be crimped by heating followed by shaping with toothed or fluted rollers and cutting with rotary blades to provide fibers of desired length. Use of specific fiber lengths may confer compatibility with various non-woven fiber processing techniques.

The following extrusion and drawing conditions may be employed. An extrusion temperature of 200° C. to 250° C. may be employed, preferably 210° C. to 247° C. The number of filaments in a fiber may be in the range 24 to 72, dependent on the equipment used. Use of fiber comprising a bundle of 50 to 72 filaments may be advantageous to improve cohesion of the bundle of filaments during drawing and may allow for a higher drawing ratio. The larger number of filaments allows the tension applied during the drawing process to be distributed between the larger number of filaments.

The rotational speed of the first godet roller (godet 1) may be 200 to 310 mpm (m/min). Use of a godet 1 speed greater than 300 mph may increase the frequency of melt breaks. An optimum speed for godet 1 may be about 295 mpm. The rotational speed of the godet 5 roller may be 350 to 1665 mpm. The rotational speeds of godets 2 to 4 may have intermediate values. A higher drawing ratio may be achieved using 72 filaments resulting a finer fiber of 3 dtex or greater at a godet 5 speed of 500 rpm or higher.

A metering pump speed may be employed. Use of a metering pump may improve stability of the process. A reduced residence time may reduce the risk of thermal degradation of the polymer.

A spin finish may be applied to the filaments before the fiber passes to the godet rollers. A non-aqueous spin finish oil may be employed; for example, Tallopol DT, Tallopon Biocone or Vystat. A spin finish content of 0.4 wt % to 4.7 wt % may be used at a spin finish pump speed of 4 to 15 rpm. A minimum of 0.4 wt % of spin finish may be employed to provide sufficient cohesion between the filaments for drawing and winding.

Fibers in accordance with this invention may be laid to form non-woven layers or webs by various methods, including carding, air laying or wet laying. The fibers in a web may be bonded by a method selected from: hydroentanglement, needle punching, chemical or adhesive bonding and thermal bonding.

In a carding method, fiber bundles are separated and individualized using carding wires to produce an orientated fiber network structure. Crimped polyvinyl alcohol fibers may be employed.

The opened polyvinyl alcohol fibers may be dried, for example, at 130° C. for 10 minutes prior to carding to improve uniformity of the resultant web. In exemplary embodiments, drying is not necessary. Use of the thermally processable fibers of this invention allows manufacture on a commercial scale.

A blend of polyvinyl alcohol (PVOH) fibers with sustainable fibers may be employed, for example the sustainable fibers may be selected from: lyocell, polylactic acid (PLA), polyhydroxy alkanoates and mixtures thereof.

A blending ratio of polyvinyl alcohol:lyocell of 70:30 wt % to 90:10 wt %, preferably 80:20 wt % or a ratio of polyvinyl alcohol:PLA of 70:30 wt % to 90:10 wt %, preferably 80:20 wt % may be employed.

The carded web may have an areal density of 60 to 40 gm$^{-2}$, for example about 50 gm$^{-2}$.

In an embodiment, 100% polyvinyl alcohol and 80:20 wt % polyvinyl alcohol:lyocell carded webs may be needle punched at 9 mm penetration depth, hydroentangled at 30 bar or chemically bonded using, for example, ethylene vinyl acetate (EVA) binder.

Through air bonding in which hot air is forced through the web, for example by convection, may be employed to melt an adhesive to avoid producing excessive compression. 80:20 wt % polyvinyl alcohol:PLA carded webs may be through air bonded at 120° C. for 2 minutes.

Air laying methods may be employed, in which a turbulent air stream is used to produce an isotropic fiber network.

In an embodiment, crimped polyvinyl alcohol fibers may be cut to a length of 5 mm and blended with pulp fibers (approximately 2 mm) Georgia Pacific (GP) cellulose. Ratios of polyvinyl alcohol:cellulose of 80:20 wt % to 20:80 wt % for example about 50:50 wt % may be employed. The areal density may be about 50 gm$^{-2}$, dependent on the application, for example single or multiple use applications.

The polyvinyl alcohol fibers may be dried, for example at 130° C. for 10 minutes, to improve separation. In exemplary embodiments, drying is not necessary.

The airlaid webs may be hydroentangled and then dried.

Fibers of this invention have the advantage that the polyvinyl alcohol fiber-containing webs may be converted into hydroentangled airlaid non-woven fabrics having a high strength. The fibers, particularly comprising warm water-soluble polyvinyl alcohol, were found to partially dissolve during the hydroentanglement process resulting in strong but stiff fabrics.

A wetlaying process may be used to form non-woven fabrics with hot water-soluble polyvinyl alcohol fibers. In this process the polyvinyl alcohol fibers are dispersed in water and transferred onto a foraminous conveyor through which the water is removed to deposit a web of fibers.

In embodiments, the fibers may be cut to a suitable length, for example 5 mm and blended with pulp fibers, for example Sodra Black, at ratios of polyvinyl alcohol:pulp of 50:50 wt % to 20:80 wt %.

Lyocell fibers (1.4 dtex/5 mm) may be blended at ratios of polyvinyl alcohol:pulp of 50:50 wt % to 20:80 wt %.

The areal density may be about 60 gm$^{-2}$. This density may be employed for manufacture of flushable wipes.

The wetlaid webs may be hydroentangled and dried at 100° C. for 30 seconds.

The tensile strength was compared with commercial products. A blend of polyvinyl alcohol:pulp:lyocell in a ratio of 40:40:20 wt % exhibited a relatively high tensile strength of 11 to 13N, typically about 12N.

Hydroentangled wetlaid fabrics of this invention incorporating pulp have relatively good tensile strength. Pulp fibers have typically high liquid absorption capacity. After hydroentanglement, the wetlaid web remains saturated resulting in partial dissolution of the polyvinyl alcohol fibers during the drying stage. The polyvinyl alcohol fibers act as a binder alongside formed hydrogen bonds between the pulp fibers.

The increase in specific energy during hydroentanglement may increase the dry tensile strength of the fabrics incorporating lyocell fibers.

Percentages and other quantities referred to in this specification are by weight unless stated otherwise and are selected from any ranges quoted to total 100%.

The invention is further described by means of example but not in any limitative sense, with reference to the accompanying drawing.

EXAMPLES

FIG. 1 is a diagrammatic view of fiber extruding apparatus in accordance with this invention. FIG. 1 illustrates apparatus for extrusion of polyvinyl alcohol fibres in accordance with the present invention. A feed hopper (1) supplies pellets of the polyvinyl alcohol composition to an extruder (2). The molten polymer is delivered from the extruder to a melt pump (3) which meters the polymer to a spin pack (4). The spin pack spins a fibre (10) through a quenching chamber (5) supplied with cooling air by a fan (11). A spin finish applicator (6) applies a coating to the fibre (10). The fibre is then delivered by roller (7) to a series of godet rollers (8) which produce drawn fibres. The fibres are then collected on a winder (9).

In embodiments of the present invention the following polyvinyl alcohol homopolymer compositions may be employed.

Polymer Composition A

| | |
|---|---|
| PVOH; degree of hydrolysis 98%; low viscosity | 35.97% |
| PVOH; degree of hydrolysis 89%; low viscosity | 35.97% |
| Trimethylol propane | 14.37% |
| Sodium benzoate | 0.21% |
| Glycerol | 4.29% |
| Water | 9.20% |

Polymer Composition B

| | |
|---|---|
| PVOH; degree of hydrolysis 99%; high viscosity | 7.193% |
| PVOH; degree of hydrolysis 98%; low viscosity | 64.737% |
| Trimethylol propane | 14.37% |
| Sodium benzoate | 0.21 |
| Glycerol | 4.29 |
| Water | 9.20% |

Polymer Composition C

| | |
|---|---|
| PVOH; degree of hydrolysis 98%; low viscosity | 35.87% |
| PVOH; degree of hydrolysis 89%; low viscosity | 35.87% |
| Di-pentaerythritol | 6.21% |
| Triacetin | 12.41% |
| Sodium benzoate | 0.25% |
| Water | 9.39% |

Polymer Composition D

| | |
|---|---|
| PVOH; degree of hydrolysis 98%; low viscosity | 22.61% |
| PVOH; degree of hydrolysis 97%; medium viscosity | 52.76% |
| Di-pentaerythritol | 4.99% |
| Sodium benzoate | 0.25% |
| Triacetin | 10.00% |
| Water | 9.39% |

Polymer Composition E

| | |
|---|---|
| PVOH; degree of hydrolysis 98%; low viscosity | 25.20% |
| PVOH; degree of hydrolysis 98%; low viscosity | 5.20% |
| PVOH; degree of hydrolysis 89%; low viscosity | 25.21% |
| Di-pentaerythritol | 5.00% |
| Triacetin | 10.00% |
| Water | 9.39% |

Polymer Composition F

| | |
|---|---|
| PVOH; degree of hydrolysis 98%; low viscosity | 27.33% |
| PVOH; degree of hydrolysis 98%; low viscosity | 27.33% |
| PVOH; degree of hydrolysis 89%; low viscosity | 27.33% |
| Di-pentaerythritol | 8.00% |
| Methyl pentanediol | 5.50% |
| Glycerol | 4.50% |

Polymer Composition G

| | |
|---|---|
| PVOH; degree of hydrolysis 98%; low viscosity | 72.45% |
| PVOH; degree of hydrolysis 99%; high viscosity | 9.20% |
| Di Pentaerythritol | 7.95% |
| Methyl pentanediol | 5.63% |
| Glycerol | 4.50% |
| Sodium benzoate | 0.27% |

Example 1

Multifilament polyvinyl alcohol fibers were extruded using the following parameters.

| Parameters | |
|---|---|
| Drying time prior to extrusion (h) | 8 |
| Extrusion temperature (° C.) | 220 |
| Metering pump speed (rpm) | 9 |
| Godet 1 speed (mpm) | 295 |
| Godet 2 speed (mpm) | 297 |
| Godet 3 speed (mpm) | 500 |
| Godet 4 speed (mpm) | 515 |
| Godet 5 speed (mpm) | 530 |
| Spin finish pump speed (rpm) | 4 |
| Spin finish content (%) | 0.4 |
| Yarn titer (dtex) | 206-214 |
| Filament count | 72 |
| Filament titer (dtex/fil) | 2.9 |
| Tenacity (cN/dtex) | 3 |
| Die hole diameter (mm) | 0.25 |
| Spin finish used | Tallopol DT |

The fibers were crimped using an IR heater temperature 220° C., speed 1.4 m/min, indented roller temperature 100° C. and throughput rate 17 g/h.

The following properties were observed using polyvinyl alcohol (PVOH) and polylactic acid (PLA).

| Parameters Compositions | Carded/ needle punched | | Carded/ hydroentangled | | Carded/ through air bonding | Carded/ chemical bonding |
|---|---|---|---|---|---|---|
| | 100% PVOH | 80:20 PVOH: Lyocell | 100% PVOH | 80:20 PVOH: Lyocell | 80:20 PVOH: PLA | PVOH & 17 wt % EVA |
| Areal density (g/m$^2$) | 45 | 48 | 46 | 54 | 65 | 51 |
| Thickness (mm) | 0.9 | 1.5 | 0.7 | 1.5 | 2.1 | 0.7 |
| Dry tensile strength (N/25 mm) | 2.1 | 7.3 | 1.8 | 7.2 | 5.0 | 42.9 |
| Wet tensile strength (N/25 mm) | 3.6 | 8.4 | 1.6 | 4.1 | 2.9 | 11.6 |
| Dispersibility in the drainline | 14 | 10 | 2 | 5 | 4 | N/A |

The properties of airlaid hydroentangled PVOH webs were as follows.

| Parameters Composition | Airlaid/Hydroentangled | | | | | |
|---|---|---|---|---|---|---|
| | 100% PVOH | 80:20 PVOH: Lyocell | 50:50 PVOH: Lyocell | 20:80 PVOH: Lyocell | 80:20 PVOH: hemp | 50:50 PVOH: pulp |
| Areal density (g/m$^2$) | 49 | 47 | 47 | 36 | 50 | 50 |
| Thickness (mm) | 0.7 | 0.7 | 0.8 | 0.7 | 0.8 | 0.7 |
| Dry tensile strength (N/25 mm) | 3.2 | 2.01 | 1.8 | 20.9 | 1.8 | 17.1 |
| Wet tensile strength (N/25 mm) | 2.0 | 1.5 | 1.8 | 0.5 | <0.1 | <0.1 |
| Dispersibility in the drainline (%) | 99 | 99 | 98 | 95 | 98 | 100 |
| Dispersibility in the sewer system (%) | 73 | 69 | 64 | 19 | 75 | 100 |

| Parameters Composition | Wetlaid/hydroentangled | | | | | |
|---|---|---|---|---|---|---|
| | 100% PVOH | 80:20 PVOH: Lyocell | 50:50 PVOH: Lyocell | 20:80 PVOH: Lyocell | 80:20 PVOH: hemp | 50:50 PVOH: pulp |
| Areal density (g/m$^2$) | 61 | 58 | 61 | 62 | 57 | 63 |
| Thickness (mm) | 0.9 | 0.9 | 0.8 | 1.6 | 1.1 | 1.0 |
| Dry tensile strength (N/25 mm) | 3.9 | 4.8 | 16.4 | 15.0 | 12.4 | 12.0 |
| Wet tensile strength (N/25 mm) | 3.1 | 3.5 | 5.2 | 1.4 | 4.4 | 3.1 |
| Dispersibility in the drainline (%) | 87 | 95 | 92 | 98 | 83 | 99 |
| Dispersibility in the sewer system (%) | 45 | 47 | 64 | 82 | 74 | 67 |

In further embodiments, the properties of wetlaid hydroentangled PVOH webs were as follows.

| Parameters Composition | Wetlaid/Hydroentangled | | |
|---|---|---|---|
| | 50:30:20% PVOH:Pulp:Viscose | 40:40:20% PVOH:Pulp:Viscose | 20:60:20% PVOH:Pulp:Viscose |
| Areal density (g/m$^2$) | 56 | 57 | 57 |
| Thickness (mm) | 0.83 | 0.92 | 1.10 |
| Dry tensile strength (N/25 mm) | 13.93 | 12.35 | 13.05 |
| Wet tensile strength (N/25 mm) | 6.38 | 4.36 | 2.56 |
| Dispersibility in the drainline (%) | 85 | 83 | 96 |
| Dispersibility in the sewer system (%) | 67 | 74 | 87 |

Example 2

The tensile strength of webs comprising polyvinyl alcohol/pulp blends were compared with commercial flushable wipes. The tensile strength was compared with lotion saturated wipes. The commercial wipes were squeezed by hand to remove excess lotion. The excess lotion was used to saturate the polyvinyl alcohol products of the present invention at a pick up of 200 wt % to 300 wt %.

The wetlaid webs hydroentangled at high specific energy (30 bars×2/bars×4) exhibited higher wet tensile strength compared to the benchmark flushable wipes and the wetlaid webs hydroentangled at low specific energy (30 bars×2/50 bars×2). The increase in the specific energy had a positive impact on the wet tensile strength of the wetlaid hydroentangled fabrics with an increase of approximately 100 to 170%.

There was no significant differences in the wet strength between the 50:50 PVOH:Lyocell and 80:20 PVOH:Lyocell fabrics hydroentangled at the high specific energy (p>0.05).

Example 3

The dispersibility in the drain line of polyvinyl alcohol/pulp blends was compared with commercial flushable wipes.

Tests were carried out to determine dispersibility in a sewer system. Commercial wipes showed low dispersibility with less than 60% passing a 5.6 mm screen.

The PVOH wetlaid fabrics hydroentangled at low specific energy (30 bars×2/50 bars×2) showed relatively good dispersibility with >70 wt % passing the 5.6 mm screen. The decrease in lyocell fiber length from 5 mm to 3 mm had a positive impact on dispersibility.

The dispersibility of the wetlaid hydroentangled fabrics decreased with increased specific energy (30 bars×2/50 bars×4). The fibers were more interlocked promoting fiber roping.

After the dispersibility test, the wetlaid webs hydroentangled at high specific energy showed fragments size <4 cm which is one of the alternative requirements to pass the dispersibility in the sewer system.

The PVOH fibers were successfully converted into wetlaid hydroentangled fabrics. The fabrics incorporating pulp fibers showed good dry and wet tensile strength and dispersibility, while the incorporation of lyocell fibers promoted the wet tensile strength but decreased the dispersibility of the hydroentangled wetlaid fabrics.

The commercial flushable wipes passed the dispersibility in the drain line test with more than 50 wt % passing through a 12.5 mm screen.

The wetlaid hydroentangled polyvinyl alcohol-containing webs exhibited excellent results with more than 80 wt % passing through a 12.5 mm screen.

Example 4

The hydroentangled wetlaid non-woven polyvinyl alcohol/pulp fabrics were compared with commercial flushable wipes.

The commercial flushable wipes showed low dispersibility with less than 60 wt % passing through a 5.6 mm sieve. The hydroentangled wetlaid fabrics incorporating 20 wt % polyvinyl alcohol fiber and 80 wt % pulp exhibited excellent results with 90 wt % passing through a 5.6 mm screen.

Webs comprising polyvinyl alcohol, pulp and viscose/lyocell exhibited better dispersibility performance in comparison to commercial flushable wipes.

Use of PVOH fibers in hydroentangled wetlaid fabrics incorporating pulp fibers improved the dry tensile strength. Incorporation of viscose or lyocell fibers improved the wet strength of the fabrics. A superior combination of wet strength and dispersibility performance was achieved using 40 wt % polyvinyl alcohol, 40 wt % pulp and 20 wt % viscose fibers.

Example 5

In a further embodiment, the following parameters were used.

| Process Variable | Polymer G (3 dtex) | Polymer G (2 dtex) |
|---|---|---|
| Extruder Zone 1 (° C.) | 230 | 232 |
| Spin Pack (° C.) | 238 | 247 |
| Throughput (kg/hr) | 1.39 | 1.39 |
| Die Head Pressure | 25 | 20 |
| Godet Speed 1 (rpm) | 391 | 585 |
| Godet Speed 5 (rpm) | 1110 | 1665 |

-continued

| Process Variable | Polymer G (3 dtex) | Polymer G (2 dtex) |
|---|---|---|
| Linear Density (dtex/filament) | 3.08 | 2.06 |
| Tenacity (cN/dtex) | 3.29-3.70 | 3.28-4.12 |

| Extruder Zone | Temperature (° C.) |
|---|---|
| Zone 1 | 225-232 |
| Zone 2 | 233-237 |
| Zone 3 | 235-242 |
| Zone 4 | 240-247 |
| Flange | 240-247 |
| Die Head | 240-247 |
| Metering Pump | 240-247 |
| Spin Pack | 240-247 |

The results show that the formulation can be drawn to a higher ratio to form finer fibers with a thickness of 2 dtex. A greater melt strength was achieved.

What is claimed is:

1. A method of manufacture of a nonwoven product comprising polyvinyl alcohol fibers comprising:
   providing a polyvinyl alcohol composition comprising homopolymeric polyvinyl alcohol having a degree of hydrolysis of 88% to 98% or greater and a molecular weight in the range from 22,000 to 38,000;
   adding a plasticizer selected from the group consisting of: diglycerol, triglycerol, fructose, ribose, xylose, D-mannitol, triacetin, pentaerythritol, dipentaerythritol, methyl pentanediol, 1,2-propanediol, 1,4-butanediol, 2-hydroxy-1,3-propanediol, 3-methyl-1,3-butanediol, 3,3-dimethyl-1,2-butanediol, polyethylene glycol 300, polyethylene glycol 400, alkoxylated polyethylene glycol, caprolactam, tricyclic trimethylolpropane formal, rosin esters, erucamide, and mixtures thereof to the composition;
   adding a stabilizer selected from the group consisting of sodium stearate, potassium oleate, sodium benzoate, calcium stearate, stearic acid, dimethyl pentane diol, propionic acid and mixtures thereof to the composition;
   melting the polyvinyl alcohol composition at a temperature from 190° C. to 250° C.;
   extruding the melted polyvinyl alcohol composition to form an extrudate;
   forming the extrudate into molten polyvinyl alcohol fibers;
   drawing the molten polyvinyl alcohol fibers to form individual molten polyvinyl alcohol fibers or bundles of molten polyvinyl alcohol fibers;
   and
   allowing the molten polyvinyl alcohol fibers to solidify to form solid polyvinyl alcohol fibers or bundles of solid polyvinyl alcohol fibers.

2. The method of claim 1 including a step of forming polyvinyl alcohol fibers into a non-woven web by carding, airlaying or wetlaying.

3. The method of claim 2, wherein the polyvinyl alcohol fibers are dried and then carded.

4. The method of claim 2, wherein polyvinyl alcohol fibers in the non-woven web are bonded by hydroentanglement, needle punching, chemical bonding or thermal bonding.

5. The method of claim 1, including blending the polyvinyl alcohol fibers with sustainable fibers.

6. The method of claim 5, wherein the sustainable fibers are selected from the group consisting of: lyocell, polylactic acid, polyhydroxy alkanoates, cellulose pulp and mixtures thereof.

7. The method of claim 6, wherein polyvinyl alcohol fibers and lyocell fibers are blended in a ratio of polyvinyl alcohol: lyocell between 70:30 to 90:10 wt %.

8. The method of claim 6, wherein polyvinyl alcohol fibers and polylactic acid fibers are blended in a ratio of polyvinyl alcohol: polylactic acid between 70:30 to 90:10 wt %.

9. The method of claim 8, wherein the ratio of polyvinyl alcohol:polylactic acid is about 80:20 wt %.

10. The method of claim 3, wherein the carded web has an areal density of 60 gm$^{-2}$ to 40 gm$^{-2}$.

11. The method of claim 10, wherein the carded web has an areal density of 50 gm$^{-2}$.

12. The method of claim 6, wherein polyvinyl alcohol fibers and lyocell fibers are blended in a ratio of polyvinyl alcohol:lyocell of 80:20 wt %.

* * * * *